L. F. DOELLINGER.
SANITARY PICNIC SPOON.
APPLICATION FILED OCT. 12, 1914.
1,128,114.
Patented Feb. 9, 1915.
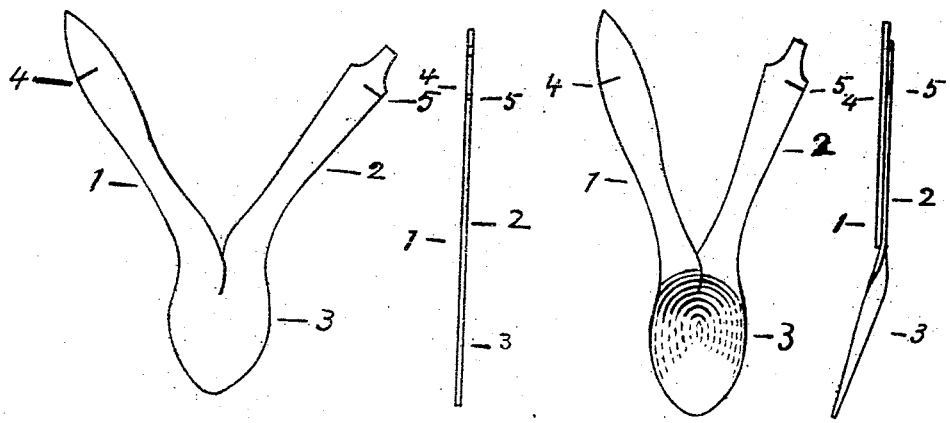
Fig 1.   1-a.   Fig 2.   2-b.
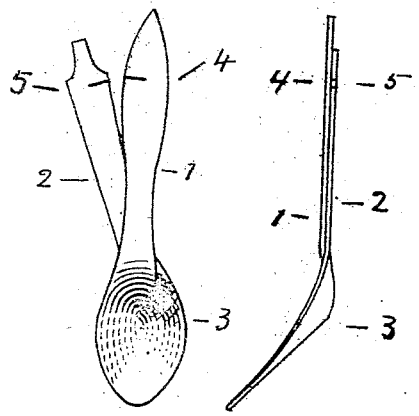
Fig 3.   3-c.
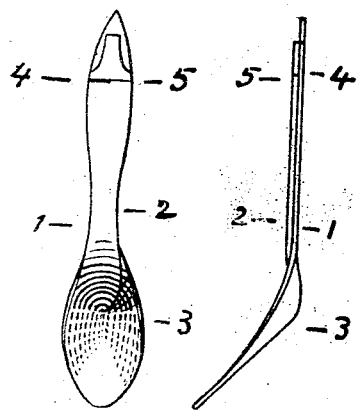
Fig 4.   4-d.

UNITED STATES PATENT OFFICE.

LOUIS F. DOHERMORE, OF DAVENPORT, IOWA.

SANITARY PICNIC-SPOON.

1,128,112.    Specification of Letters Patent.    Patented Feb. 9, 1915.

Application filed October 12, 1914. Serial No. 666,413.

*To all whom it may concern:*

Be it known that I, LOUIS F. DOHERMORE, a citizen of the United States of America, residing at and in the city of Davenport, county of Scott, State of Iowa, have invented a new and useful Sanitary Picnic-Spoon, of which the following is a specification.

My invention relates to an improvement in spoons, in which paper, wood-fiber, metal and other pliable and fibrous substances having been first cut into the required form, may be adjusted upon itself, thereby forming a complete spoon, consisting of and comprised of a handle and bowl; and when so formed is useful as an eating tool and for general table, culinary and drug use and as a medium for advertising; and of such trifling cost as to economically permit being thrown away after each use, a new one being substituted for each succeeding use, thus insuring a cheap, safe, sanitary spoon at all times, for hotels, public eating-houses, cafés, refreshment parlors, travelers and campers, picnic parties, druggists, and for all purposes, yet capable of being cleansed and re-used.

In adaptation the user or hose folds the form into a real spoon when the same is desired for use, unfolding the same after it is used if desire is to cleanse the same. Desired advertisements being printed on the same.

I attain these objects by the mechanism illustrated in the accompanying drawing, in which:—

Figures 1 and 1ª are a plan and side elevation respectively of the blank for the spoon. Figs. 2 and 2ª, and Figs. 3 and 3ª, are plan and side elevations respectively in each group or instance, showing two steps in bringing the handle members together to form the handle and spoon bowl. Figs. 4 and 4ª, are a plan and side elevation respectively of the spoon ready for use.

Applicant's device is a spoon, comprising a bowl 3 and a handle consisting of the members 1 and 2. The spoon is made from a blank consisting of an elongated disk-like body having at one end or edge two handle members 1 and 2 extending from said disk-like body at a suitable angle to each other, preferably less than a right angle. A short slit is made into the disk-like body between the handle members 1 and 2. The free ends of the members 1 and 2 are provided with slots 4 and 5 which are substantially oppositely disposed with reference to each other and by means of which slots the members 1 and 2 are secured in superposed relation thus forming a handle and spoon bowl of the blank, shown in Fig. 1.

The formation of the spoon is attained and facilitated by folding the angularly disposed handle members 1 and 2 of blank, Fig. 1, toward each other as illustrated in Figs. 2 and 3, which process is facilitated by the slit in the disk-like body 3 between the handle members 1 and 2 where the same join upon the said disk-like body 3, which slit permits the members 1 and 2 to begin lapping at the said edge of the said disk-like body 3, from which the angularly disposed members regularly extend, thus permitting the said members 1 and 2, to regularly assume a superposed relation. By pressing the said angularly disposed handle members inward toward and upon each other is also facilitated the formation of the spoon bowl, which movement causes the disk-like body 3 to curve into bowl-shape, as shown at 3, of Figs. 4 and 4ª. The process of formation is completed by interlocking the free ends of the angularly disposed handle members 1 and 2, by means of slits 4 and 5 into superposed relation by respectively inserting the said handle members into the respective slots 4 and 5 of each other, as is shown completed in said Figs. 4 and 4ª completing the bowl and handle of the spoon.

I claim:

1. A spoon composed of pliable material consisting of a spoon bowl having two extensions projecting from one edge of said bowl, said extensions having interlocking means whereby the extensions are secured in superposed relation to form a handle for the spoon bowl.

2. A spoon composed of pliable material consisting of a spoon bowl having two extensions projecting from one end of said bowl said extensions having interlocking means comprised of oppositely disposed slots in the handle members whereby the extensions are secured in superposed relation to form a handle for the spoon bowl.

3. A spoon composed of pliable material consisting of a spoon bowl having two extensions projecting from one end of said bowl, said extensions having a slit between them where they join the bowl of the spoon whereby the formation of the bowl is facilitated, and said extensions having interlocking means whereby the extensions are secured in superposed relation to form a handle for the spoon bowl.

4. A blank for a spoon, being a blank form, composed of pliable material, consisting of an elongated disk having two extensions projecting from one edge, and having a slit between the extensions where they join the disk, and the extensions having slots in their respective outer edges, all for the purposes specified

LOUIS F. DOELLINGER.

Witnesses:
GLENN D. KELLY,
MINER C. RUST.